United States Patent [19]

Bonnesen et al.

[11] Patent Number: 4,680,665

[45] Date of Patent: Jul. 14, 1987

[54] GAS DISCHARGE ARRESTER

[75] Inventors: John S. Bonnesen, Northbrook; Timothy J. Sporer, Bensenville, both of Ill.

[73] Assignee: Reliance Comm/Tec Corporation, Chicago, Ill.

[21] Appl. No.: 804,056

[22] Filed: Dec. 3, 1985

[51] Int. Cl.[4] .................................... H02H 9/06

[52] U.S. Cl. .................................... 361/120; 313/231.11

[58] Field of Search .................................... 361/117-120, 361/129; 313/231.01, 231.11

[56] References Cited

U.S. PATENT DOCUMENTS

| | | | |
|---|---|---|---|
| 3,588,576 | 6/1971 | Kawiecki | 361/120 X |
| 3,979,646 | 9/1976 | Pectie et al. | 361/120 |
| 3,989,985 | 11/1976 | Lange et al. | 361/120 |
| 4,241,374 | 12/1980 | Gilberts | 361/119 X |
| 4,287,548 | 9/1981 | Hahndorff | 313/231.11 X |
| 4,466,043 | 8/1984 | Munt | 361/120 |
| 4,493,006 | 1/1985 | Lange et al. | 361/120 X |
| 4,578,733 | 3/1986 | Shigemori et al. | 361/120 |

*Primary Examiner*—Roy N. Envall, Jr.

*Assistant Examiner*—Jeffrey A. Gaffin

*Attorney, Agent, or Firm*—Michael M. Rickin

[57] ABSTRACT

A gas discharge arrester in which annular bands are attached to the inside surface of the arrester. The spacing between the bands is equal to or somewhat greater than the width of the interelectrode gap. Each band is in contact with its associated electrode. The bands function to minimize the effect that placing the arrester in a metallic cup has on the symmetry of the electric field in the arrester, and, at the same time, act to lower the impulse breakdown of the arrester.

4 Claims, 4 Drawing Figures

GAS DISCHARGE ARRESTER

BACKGROUND OF THE INVENTION

1. Field of the Invention

This invention relates to gas discharge surge arresters and more particularly to an arrester of the above type in which the effect on the breakdown voltage of external metal grounded structures is essentially minimized.

2. Description of the Prior Art

Surge voltage arresters of the cold cathode type serve as the primary arrester and source of protection in various line protectors. Such arresters typically include some type of air gap as a back-up or ventsafe feature in the event of the failure of the gas tube arrester.

One example of such a surge voltage arrester is that described in U.S. Pat. No. 4,241,374 entitled "Surge Voltage Arrester With Ventsafe Feature" which issued on Dec. 23, 1980 in the name of Alexander G. Gilberts and is assigned to the assignee as is the present invention. As described therein the gas tube arrester is housed within a metallic cup. The sidewall of the cup has a diametrically enlarged annular cylindrical end portion near its open end. This enlarged end portion is used to define a secondary air gap, i.e., the enlarged portion defines the ventsafe portion.

As is well known the gas tube has a predetermined breakdown voltage which is dependent on a number of factors including the spacing of the electrodes in the tube. When, prior to inseration in the cup, the breakdown voltage of the tube is tested it has been found that breakdown occurs at essentially the same voltage independent of which electrode is made the cathode. When the breakdown voltage is tested again after the tube has been inserted in the cup, it has been found that the voltage at which the tube breaks down now depends on which electrode is made the cathode. In other words, when the tube is inserted in the cup the breakdown voltage in both directions is not the same and in fact there is a substantial differential between those breakdown voltages.

In most applications where such ventsafe surge arresters are used, this differential in breakdown voltage is of little consequence. There are, however, some applications for such surge arresters where the specifications require that the arrester have a narrow range for its breakdown voltage. Therefore, it is desirable to minimize the asymmetrical effect that the cup has on the arrester's breakdown voltage.

SUMMARY OF THE INVENTION

A surge arrester has two electrodes which are separated from each other by and are secured to an insulator tube. The front portions of the electrodes define a gap therebetween. A gas fills the space between the electrodes within the tube.

The arrester includes two conductive bands which are attached to the inner surface of the tube. The bands cover the inner circumference. One of the bands is in contact with one of the electrodes and the other of the bands is in contact with the other of the electrodes.

DESCRIPTION OF THE PREFERRED EMBODIMENT

Figure 1:
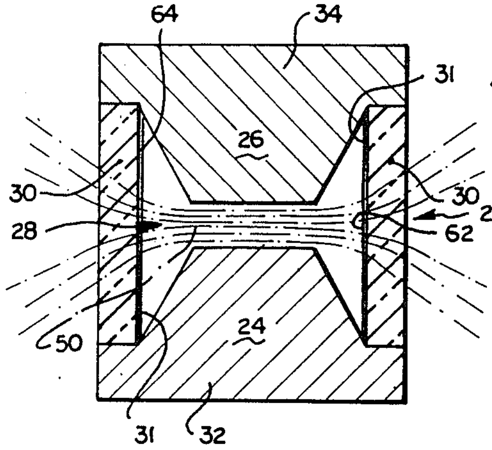
FIG. 1 (PRIOR ART)
FIG. 1 is a sectional view of a prior art surge voltage arrester.

Referring now to FIG. 1 there is shown a ventsafe surge arrester similar to the type of arrester shown in the aforementioned U.S. Pat. No. 4,241,374. As described therein the arrester comprises a gas tube 22 having opposed electrodes 24, 26 that define an arc gap 28 therebetween. The electrodes 24, 26 are separated by a tubular insulator 30 of ceramic or the like to which the electrodes 24, 26 are brazed or soldered in the usual manner. Thus, the electrodes respectively have annular electrode flanges 32, 34 at which the electrodes 24, 26 are silver soldered to the ends of the insulator 30 by rings (not shown).

Figure 2:
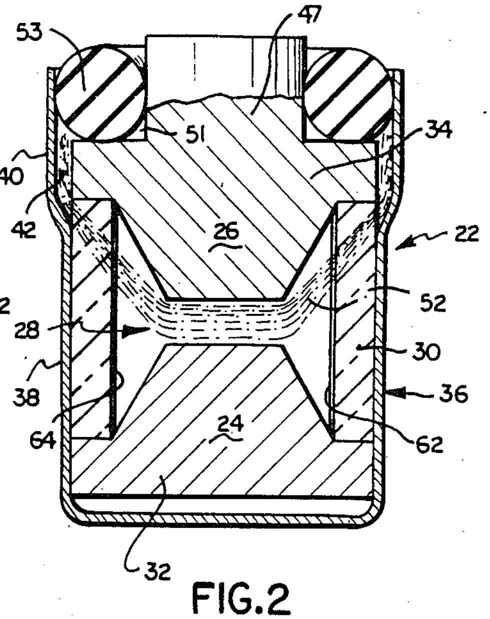
FIG. 2 (PRIOR ART)
FIG. 2 is a sectional view of the surge voltage arrester of FIG. 1 in combination with a cup.

The gas tube 22 is coaxially housed as shown in FIG. 2 in a metallic cup 36 having a cylindrical sidewall 38. Near the open end of the cup 36 the sidewall 38 has diametrically enlarged annular cylindrical end portion 40 which surrounds the peripheral edge of the electrode flange 34. This end portion 40 defining the open end of the cup 36 is radially spaced from the electrode flange 34 and from an adjacent part of the insulator 30 so as to define a secondary air gap 42 of annular configuration.

The electrode flange 34 has a metal contact thereagainst formed by a cylindrical section 47. The section 47 forms with the adjacent end surface of the flange 34 a groove 51 for receiving an annular O-ring 53. The O-ring 53 is of pliable material, preferably an elastomer, for exampler silicone rubber, although other elastomers might also be suitable. The O-ring is of a width such that it substantially spans the gap between the section 47 and the end portion 40. A sealing compound (not shown) may, if necessary, be disposed over the O-ring 53 and seals against a portion thereof. The compound, which may also be a silicone, is applied against the end portion 40 and the surface of the section 47. As a result, the secondary air gap 42 is sealed against contaminants.

As is well known, the combination of gas tube 22 and cup 36 of FIG. 2 is then placed in a suitable housing of the type well known to those skilled in the art to thereby form a protector. The protector is adapted to be mounted in a suitably arranged dielectric block such that electrode 26 is placed in contact through section 47 with the line to be protected. When the protector is mounted in the dielectric block the arc gaps 28 and 42 are electrically coupled in paralled circuits from the line contact to the ground contact. The width of the arc gap 42 is such that its breakdown voltage is greater than that of the breakdown voltage across the arc gap 28 of the gas tube 22. Consequently, when the gas tube arrester is operating properly as a primary surge arrester an overvoltage on the line to be protected will result in a discharge across the gas tube arc gap 28 to ground. The secondary surge arrester will not discharge across the air gap 42. However, if the gas tube should fail due to leakage, some protection will be afforded by a discharge to ground across the air gap 42 even though the breakdwon voltage thereacross is somewhat higher than the breakdown voltage across the gas tube when the latter is functioning normally.

Also, as is well known in the art, gas tube 22 includes first and second pairs of conductors which are deposited on the inner wall 31 of insulator 30. As shown in FIGS. 1 and 2 a first pair of conductors 62 (only one of which appears in the figures) is deposited on inner wall 31 such that one end of each of the conductors is connected to electrode 24. A second pair of conductors 64 (only one of which is shown in the figures) is deposited on inner wall 31 such that one end of each of the conductors is connected to electrode 26.

The two conductors of first pair 62 are deposited on the inner wall 31 such that they are both parallel to the longitudinal axis of the tube 22 and are spaced apart from each other by 180°. The two conductors of second pair 64 are deposited on the inner wall 31 such that they are also both parallel to the longitudinal axis of tube 22 and are spaced apart from each other by 180° and from the conductors of the first pair by a predetermined distance which is a maximum at and is typically (as is shown in FIGS. 1 and 2) 90°. The conductor pairs 62, 64 are preferably of carbon and are usually deposited on inner wall 31 by means of a pencil. An HB pencil has been found satisfactory for this purpose.

As is well known the conductor pairs 62 and 64 improve the impulse breakdown of tube 22, i.e., the ability of the tube to respond to fast rising voltages (surges). Without such conductor pairs, tube 22 would not be able to respond to surges in a time which is short enough to arrest them.

As described previously, placing gas tube 22 in cup 36 causes the breakdown voltage of the tube to become asymmetrical. This effect of the cup on the tube breakdown voltage can easily be established by testing the breakdown voltage both before and after the tube is placed in the cup. In testing ten samples of a prior art tube 22 before its insertion in the cup it has been found that when electrode 26 is made positive with respect to electrode 24, i.e., electrode 24 acts as the cathode, the breakdown voltage averages 243 volts. When electrode 24 is made positive with respect to electrode 26, i.e., electrode 26 acts as the cathode, the breakdown voltage of the ten tubes averages 232 volts. Therefore, the tube 22 of FIG. 1 has a breakdown voltage which is essentially independent of which of the electrodes 24, 26 is made the cathode.

The electric field which occurs in tube 22 of FIG. 1 is shown therein by the field lines, i.e., lines of equal potential 50. As is shown in FIG. 1 those lines are uniform in the region of the inter-electrode arc gap 28. This means that the electric field is evenly distributed throughout gap 28 and therefore does not favor either of the electrodes 24, 26. The breakdown voltage for the tube of FIG. 1 will then be independent of which electrode is made the cathode as the strength of the electric field in the gap is one of the factors which determines the tube's breakdown characteristics.

The ten tubes 22 were then tested again after they were inserted in their associated cup 36 in the manner shown in FIG. 2. The result of those tests was that when electrode 24 is made the cathode the breakdown voltage of the tubes is in the range of 230 to 244 volts with the breakdown voltage averaging about 238 volts. When electrode 26 was made the cathode the breakdown voltage of the tubes dropped to as low as 190 volts and was as high as 216 volts with the average for all ten tubes being 209 volts. In fact, the tube which had the highest tested breakdown voltage (244 volts) when electrode 24 was the cathode also had the lowest tested breakdown voltage (190 volts) when electrode 26 was the cathode. Therefore prior art tubes which have a very narrow range of breakdown voltages in both directions when not in cup 36 become upon insertion into the cup 36 tubes whose range of breakdown voltages become substantially wider. This substantially wider range of breakdown voltages which is found in prior art tubes after their insertion into cup 36 is of consequence where it is desired to use the tube in those applications where the specifications require a narrow range of breakdown voltage while simultaneously requiring the ventsafe feature provided by the cup. Such specifications exist in connection with the use of ventsafe gas tubes as surge arresters for digital switching systems.

We believe that this asymmetry of the breakdown voltage arises from the effect that the cup has on the electric field within the tube. That effect is shown by the field lines 52 of FIG. 2. As shown therein the field lines 52 are nonuniform in the gap 28. The lines are closer together in the vicinity of electrode 26 than they are in the vicinity of electrode 24. This means that a higher percentage of the interelectrode voltage will be closer to electrode 26 than to electrode 24. When electrode 26 is made the cathode the higher electric field in its vicinity causes the tube 22 to break down at a voltage which is lower than the breakdown voltage when the tube is not in cup 36. When electrode 24 is made the cathode the lower electric field in its vicinity may cause the tube to break down at a voltage which is actually higher than the breakdown voltage when the tube is not in cup 36. Therefore, when electrode 26 is made the cathode, the asymmetry in the field tends to aid the release of electrons from the cathode; whereas when electrode 24 is made the cathode, the asymmetrical field tends to inhibit the release of electrons. Thus the placing of tube 22 into cup 36 leads to an asymmetry in the tube's breakdown voltages.

Figure 3:
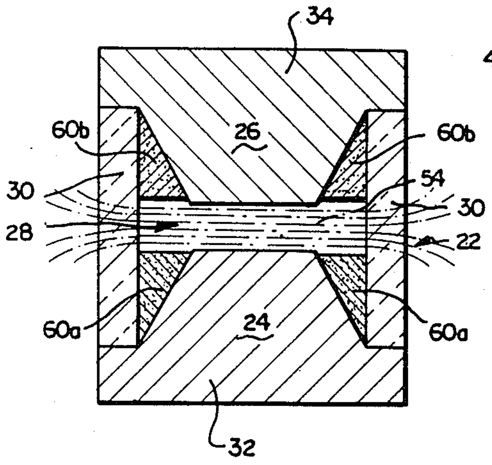
FIG. 3 is a sectional view of the surge voltage arrester of the present invention.

Referring now to FIG. 3 there is shown a gas tube 22 which, in accordance with the present invention, includes means for minimizing the asymmetrical effect that the cup 36 has on the breakdown voltage of the tube. Like parts of the tube shown in FIG. 3 are numbered exactly as in FIG. 1. The difference between the gas tubes shown in FIGS. 1 and 3 is the inclusion in the gas tube of FIG. 3 of two electrically conductive annular bands 60*a* and 60*b* which are attached to the inside surface 31 of tube 22. Bands 60*a* and 60*b* are spaced apart from each other and are each in contact with a respective one of the electrodes 24, 26. Band 60*a* is in contact with electrode 24 and band 60*b* is in contact with electrode 26. The width of the bands is such that the spacing therebetween is approximately equal to or somewhat greater than the width of the inter-electrode arc gap 28.

The electric field in the gas tube 22 of FIG. 3 is shown therein by the equal potential lines 54. As can be seen the conductive bands 60*a*, 60*b* have little or no effect on the uniformity of the electric field in the region of the inter-electrode gap 28. Therefore the gas tube of FIG. 3 has, in a manner similar to the gas tube of FIG. 1, a breakdown voltage which is essentially independent of which of the electrodes 24, 26 is made the cathode.

Figure 4:
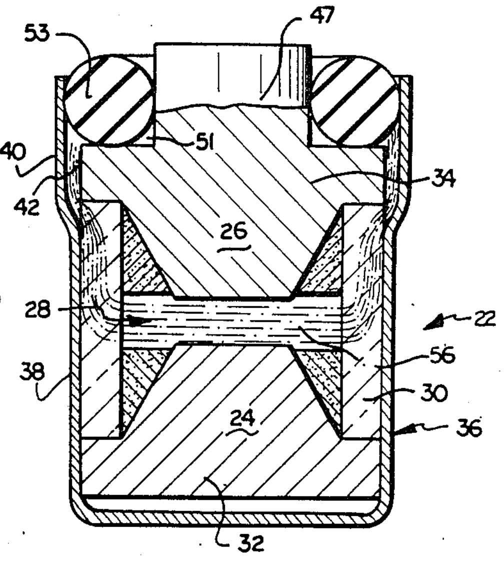
FIG. 4 is a sectional view of the surge voltage arrester of FIG. 3 in combination with a cup.

Referring now to FIG. 4 there is shown the combination of the gas tube 22 of FIG. 3 and cup 36. With the exception of conductive bands 60*a* and 60*b* the tube-cup combination of FIG. 4 is identical to the tube-cup combination of FIG. 2. Therefore, like parts shown in FIG. 4 are numbered exactly as in FIG. 2 and no further explanation of the construction of the tube-cup combination shown in FIG. 4 is needed.

The effect that the conductive bands 60*a* and 60*b* have on the electric field in the combination of FIG. 4 is shown therein by the equal potential lines 56. As can be seen by a comparison of FIGS. 2 and 4, the effect of bands 60*a* and 60*b* is to cause the electric field to be essentially uniform in the region of the interelectrode gap 28. The breakdown voltage of the tube-cup combination of FIG. 4 is then essentially independent of which of the electrodes 24, 26 is made the cathode. The field becomes nonuniform in ceramic 30 and air gap 42 but this has little or no effect on the breakdown voltage of the tube-cup combination shown in FIG. 4. Therefore, the addition of annular conductive bands 60*a*, 60*b* to tube 22 acts as a means for minimizing the asymmetrical effect that cup 36 has on the breakdown voltage when the tube is inserted therein. As can be seen from a comparison of FIGS. 1 and 2 with FIGS. 3 and 4, respectively, the gas tube of the present invention is not shown as having the conductor pairs 62 and 64. The reason is that the conductive bands 60*a* and 60*b* serve not only to minimize the asymmetrical effect that cup 36 has on the breakdown voltage as described above but also serve to improve the impulse breakdown of the tube obviating the need for pairs 62 and 64 although the same may be included without detriment to the operation of our invention. Therefore, the addition of the annular conductive bands serves to improve both the asymmetry in breakdown voltage and the impulse response of the tube.

Ten tubes 22 (having the same nominal breakdown voltage as the prior art tubes tested previously and described above) embodied in accordance with the present invention were tested prior to insertion in cup 36. With electrode 24 as the cathode the breakdown voltage averaged a little less than 246 volts. With electrode 26 as the cathode the breakdown voltage averaged 236 volts. After insertion in cup 36 the same ten tubes were tested again. With electrode 24 as the cathode the breakdown voltage averaged 245 volts, ranging from a low of 238 volts to a high of 255 volts. With electrode 26 as the cathode the breakdown voltage averaged 232 volts, ranging from a low of 223 volts to a high of 237 volts.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

We claim:

1. In a surge voltage arrester of the type having a gas-tight housing wherein a pair of discharge electrodes are arranged with their active electrode surfaces facing each other and spaced apart in a tubular insulating body, the improvement comprising: two axially spaced annular conductor bands attached to the inner surface of said body, said bands covering the inner circumference of said body, one of said bands being in electrical contact with one of said electrodes and the other of said bands being in electrical contact with the other of said electrodes.

2. The device of claim 1 wherein the spacing between said bands is substantially aligned with said gap.

3. In a surge voltage arrester of the type having a gas-tight housing wherein a pair of discharge electrodes are arranged with their active electrode surfaces facing each other and spaced apart in a tubular insulating body, the improvement comprising: two axially spaced annular conductor bands attached to the inner surface of said body, said bands being of a predetermined type of conductive material, said bands covering the inner circumference of said body, one of said bands being in electrical contact with one of said electrodes and the other of said bands being in electrical contact with the other of said electrodes, said conductor bands being the only conductive material of said predetermined type on said inner surface of said body.

4. The device of claim 3 wherein the spacing between said bands is substantially aligned with said gap.

* * * * *